(12) United States Patent
Ko

(10) Patent No.: US 7,779,973 B2
(45) Date of Patent: Aug. 24, 2010

(54) TRANSMISSION MECHANISM WITH THE FUNCTION OF THE SHOCK ABSORPTION

(76) Inventor: Chen-Hui Ko, No. 342, Ta Tung Road, Koeishan Hsiang, Taoyuan Hsien (TW)

( * ) Notice: Subject to any disclaimer, the term of this patent is extended or adjusted under 35 U.S.C. 154(b) by 1003 days.

(21) Appl. No.: 11/480,403

(22) Filed: Jul. 5, 2006

(65) Prior Publication Data
US 2008/0006105 A1    Jan. 10, 2008

(51) Int. Cl.
*F16F 9/32* (2006.01)
*F16H 25/20* (2006.01)
*F16H 27/02* (2006.01)

(52) U.S. Cl. ................ 188/300; 74/89.23; 482/54

(58) Field of Classification Search ............ 464/20; 267/175, 177; 74/128, 89.23; 188/300
See application file for complete search history.

(56) References Cited

U.S. PATENT DOCUMENTS

| | | | | | |
|---|---|---|---|---|---|
| 3,306,078 | A | * | 2/1967 | Hughes | 464/20 |
| 3,383,883 | A | * | 5/1968 | Dutaret | 464/20 |
| 3,618,927 | A | * | 11/1971 | Nicholls | 267/48 |
| 4,079,922 | A | * | 3/1978 | Nicholls | 267/218 |
| 4,956,755 | A | * | 9/1990 | Maglica et al. | 362/206 |
| 5,346,045 | A | * | 9/1994 | Bennett et al. | 192/141 |
| 6,155,545 | A | * | 12/2000 | Noro et al. | 267/221 |
| 6,811,518 | B2 | * | 11/2004 | Lin | 482/54 |
| 6,811,519 | B2 | * | 11/2004 | Kuo | 482/54 |
| 6,964,632 | B1 | * | 11/2005 | Ko | 482/54 |
| 7,066,041 | B2 | * | 6/2006 | Nielsen | 74/89.35 |
| 2006/0081079 | A1 | * | 4/2006 | Jaecklin et al. | 74/89.23 |

FOREIGN PATENT DOCUMENTS

EP    1457710 A1 *    9/2004

* cited by examiner

*Primary Examiner*—Robert A Siconolfi
*Assistant Examiner*—Stephen Bowes
(74) *Attorney, Agent, or Firm*—Rosenberg, Klein & Lee

(57) ABSTRACT

A transmission mechanism with the function of the shock absorption includes a transmission unit adapted to receive a drive gear set within a housing; a motor mounted on the external side of the housing for providing the drive gear set with necessary driving power; a transmission rod disposed within the drive gear set to allow for a power transmission; a shock-absorbing unit including a fixing sleeve being disposed at the external side of the housing with respect to the internal end of the transmission rod, a shock-absorbing spring being installed within the fixing sleeve, a telescopic lever being adapted to actuate the shock-absorbing spring; and an adjusting unit interposed between the transmission rod and the shock-absorbing unit. In comparison with the prior art having problems of incomplete integrity and inadequate shock absorption, the invention has an integral configuration and ensures an excellent shock absorption.

7 Claims, 17 Drawing Sheets

TRANSMISSION MECHANISM WITH THE FUNCTION OF THE SHOCK ABSORPTION

BACKGROUND OF THE INVENTION

1. Field of the Invention

The invention relates to a transmission mechanism with the function of the shock absorption, and more particularly to a transmission mechanism in which an adjusting unit is installed.

2. Description of the Related Art

As shown in FIG. 1, a conventional treadmill 60 includes a base frame 61 on which a platform 62 is mounted. A running board 63 and a continuous moving belt 64 are placed on the platform 62. In order to enhance the comfort in operating the treadmill 60, the running board 63 has a shock-absorbing effect. The most common shock-absorbing design is either to interpose a shock-absorbing element like cushioning pad between the running board 63 and the base frame 61 or to place a cushioning layer (not shown) on the surface of the running board 63 for achieving the cushioning effect of the continuous moving belt 64. However, this design has problems of incomplete integrity and inadequate shock absorption. The reason for that lies in that the platform 62 and the running board 63 are still rigid in spite of the cushioning pad or the cushioning layer thereon. The reactive force of the running board 63 acting on the feet is great when the operator walks on the continuous moving belt 64. In addition to the discomfort, a long-term use of this kind of treadmill will cause exercise injuries.

Besides, a transmitting mechanism having a lifting effect is often available between the platform 62 and the base frame 61 for adjusting the angle of elevation of the platform 62 with respect to the horizontal, thereby meeting different requirements of the operators. This transmitting mechanism (or so-called lifting motor) has to match different space and lifting mechanism. As shown in FIGS. 2A and 2B, a transmitting mechanism 70 has one end pivotally coupled to a protruding ear 611 of the base frame 61 and the other end pivotally coupled to an actuating piece 651 of the drive lever 65. In retracting a transmission rod 72 by a motor 71, the drive lever 65 rotates on a pivoting portion 652, thereby forcing a lifting rod 66 in a raised position. The angle θ of the elevation of the platform 62 including the running board can be adjusted in a pulling (retracting) way. As shown in FIGS. 3A and 3B, the pivoting position between the transmission rod 72 and the drive lever 65 is different from the above-mentioned embodiment. The angle θ of the elevation of the platform 62 is, on the contrary, adjusted in a pushing (extending) way. From the aforementioned descriptions, the angle θ of the elevation of the platform 62 is adjustable in the pulling (retracting) or pushing (extending) way according to the lifting mechanism. No matter which way is applied, the whole structure of the transmitting mechanism 70 is still a rigid configuration which does not contribute to the shock-absorbing effect of the platform 62. Meanwhile, the transmitting mechanism 70 is fitted to the structure such that an additional cushioning mechanism is not able to be added to the platform 62. Accordingly, the shock-absorbing effect of the conventional treadmill has not improved yet.

SUMMARY OF THE INVENTION

It is a primary object of the invention to eliminate the above-mentioned drawbacks and to provide a transmission mechanism with the function of the shock absorption that ensures a cushioning action in a pulling (retracting) or pushing (extending) way when a platform coupled to the transmission mechanism is subject to the load of the weight of the operator, thereby achieving a better comfort in operation and reducing the risk of exercise injuries to the minimal extent.

In order to achieve the above-mentioned object, the transmission mechanism with the function of the shock absorption includes:

a) a transmission unit adapted to receive a drive gear set within a housing;

b) a motor mounted on the external side of the housing for providing the drive gear set with necessary driving power;

c) a transmission rod disposed within the drive gear set to allow for a power transmission;

d) a shock-absorbing unit including a fixing sleeve being disposed at the external side of the housing with respect to the internal end of the transmission rod, a shock-absorbing spring being installed within the fixing sleeve, a telescopic lever being adapted to actuate the shock-absorbing spring; and e) an adjusting unit interposed between the transmission rod and the shock-absorbing unit.

BRIEF DESCRIPTION OF THE FIGURES

The accomplishment of this and other objects of the invention will become apparent from the following descriptions and its accompanying figures of which.

DETAILED DESCRIPTION OF THE PREFERRED EMBODIMENT

Figure 1:
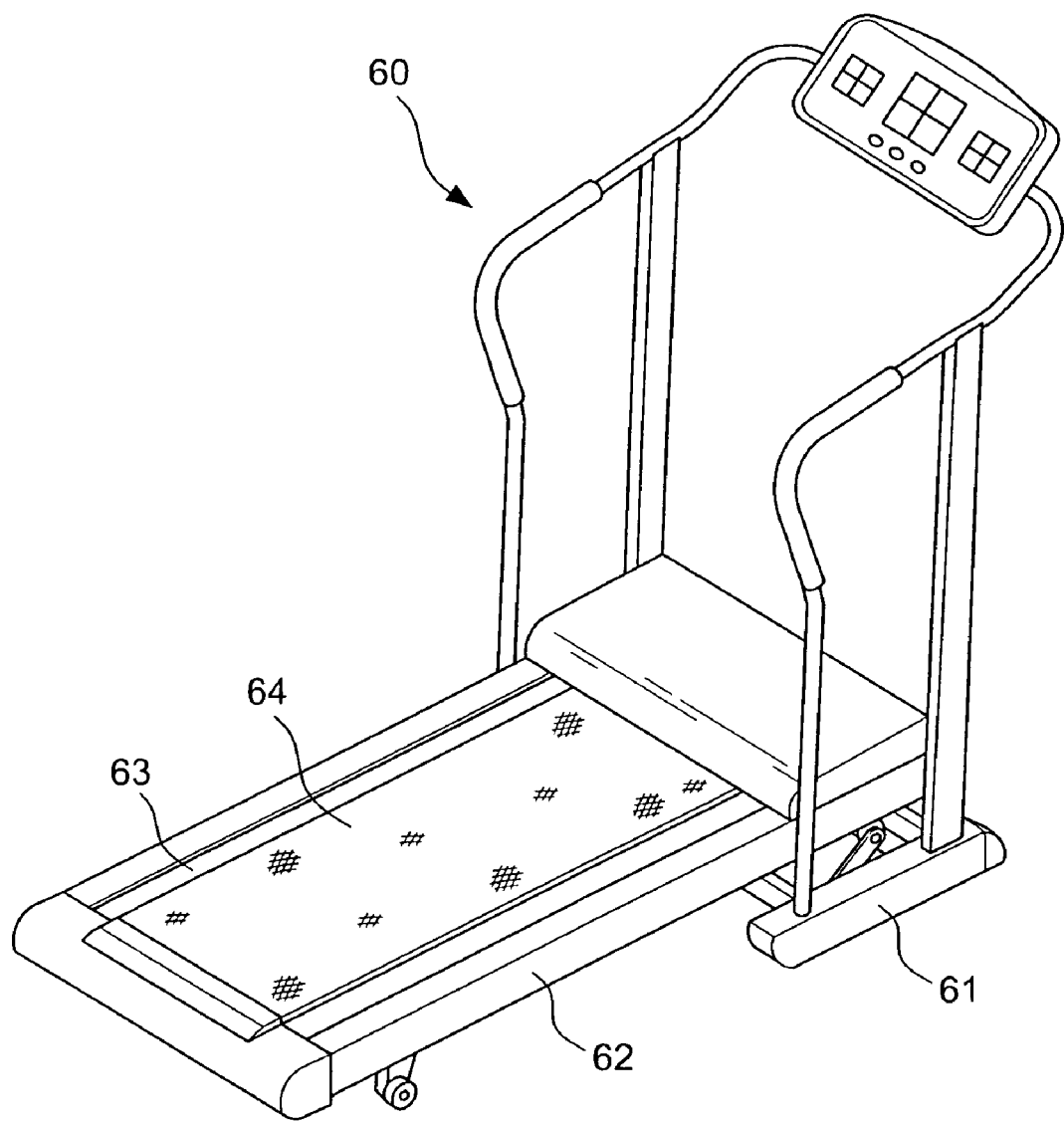
FIG. 1 is a perspective view of a conventional treadmill.

First of all, referring to FIGS. 4, 5, 6A and 6B, a first embodiment of the invention includes a transmission unit 10, a motor 20, a transmission rod 30, and a shock-absorbing unit 40.

The transmission unit 10 is adapted to receive a drive gear set 11 within a housing 12.

The motor 20 is mounted on the external side of the housing 12 for providing the drive gear set 11 with necessary driving power.

The transmission rod 30 is disposed within the drive gear set 11 to allow for a power transmission. The transmission rod 30 in accordance with the embodiment is a spindle. In other words, the drive gear set 11 is driven by the motor 20 in rotation. Thereafter, the transmission rod 30 is extended and retracted in axial direction by means of the internal thread in one of the gears of the drive gear set 11. The above-mentioned belongs to the basic principle of mechanic transmission so that no further descriptions are given hereinafter.

Figure 2A:
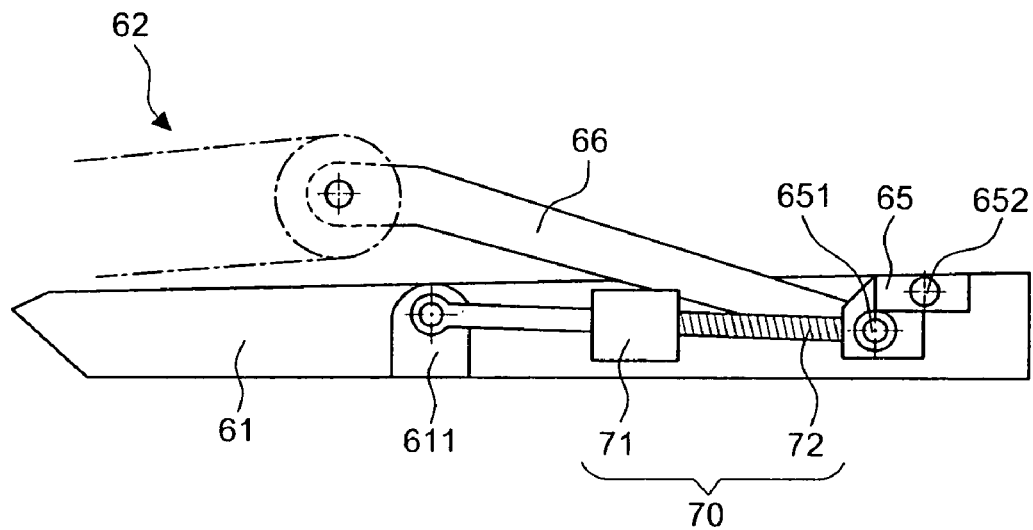
FIGS. 2A and 2B are schematic drawings of a transmitting mechanism of the conventional treadmill.
Figure 2B:
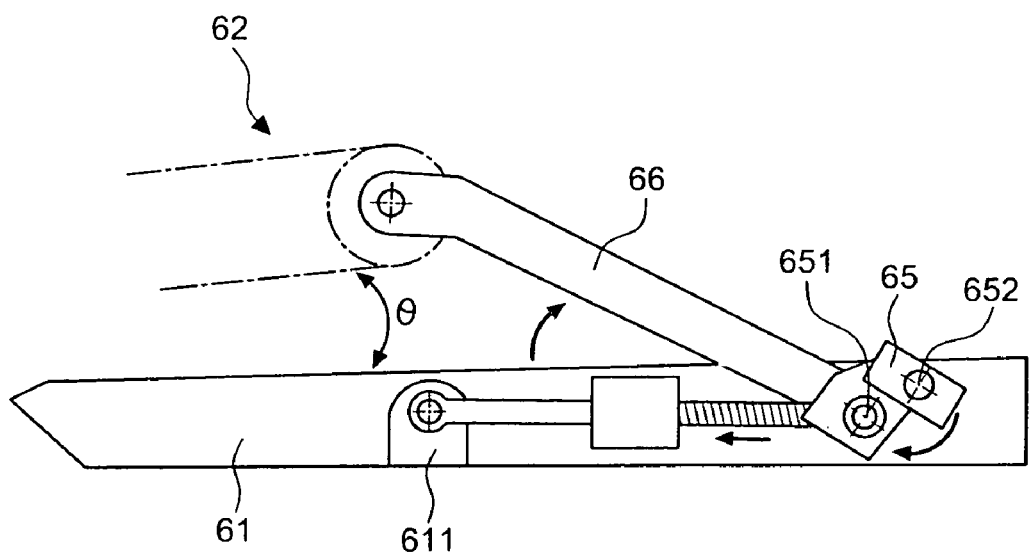
Figure 3A:
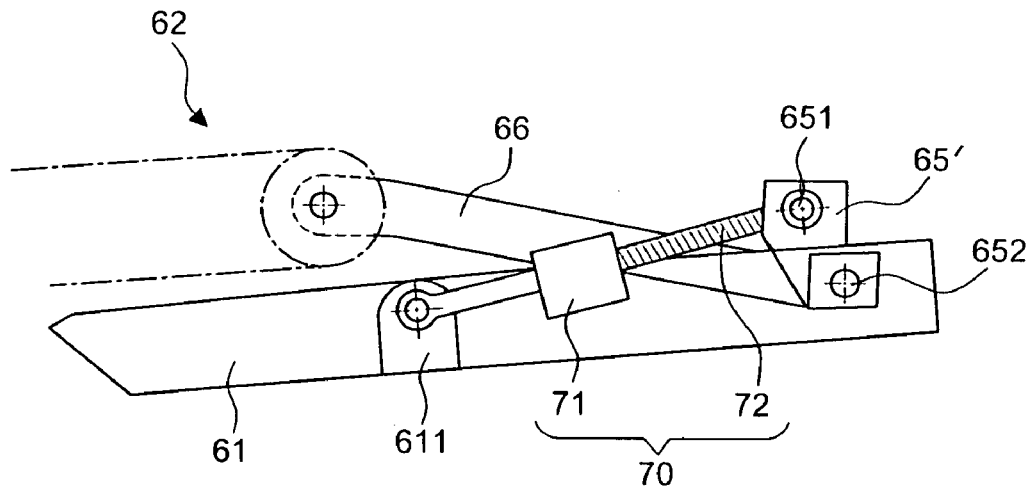
FIGS. 3A and 3B are schematic drawings of another transmitting mechanism of the conventional treadmill.
Figure 3B:
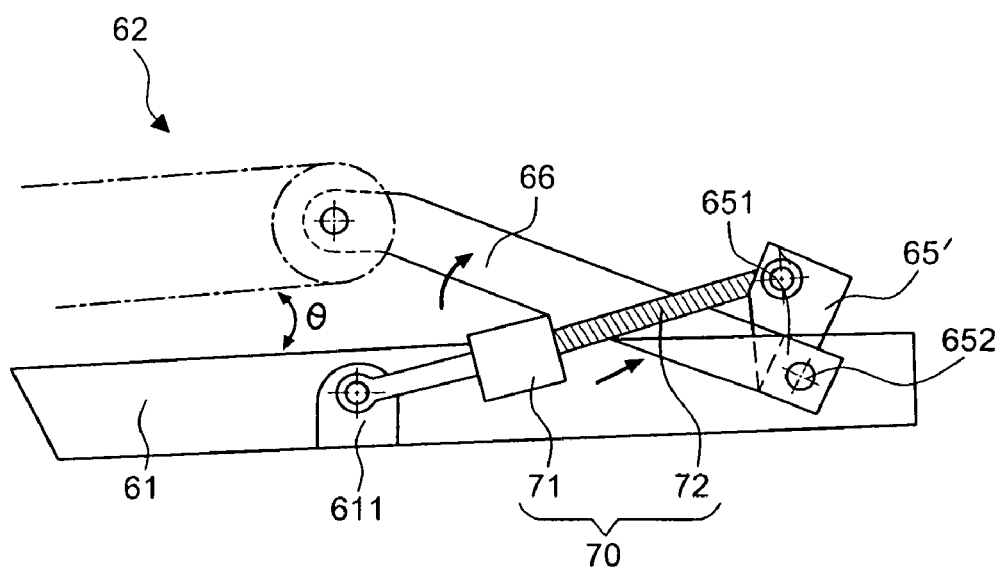
Figure 4:
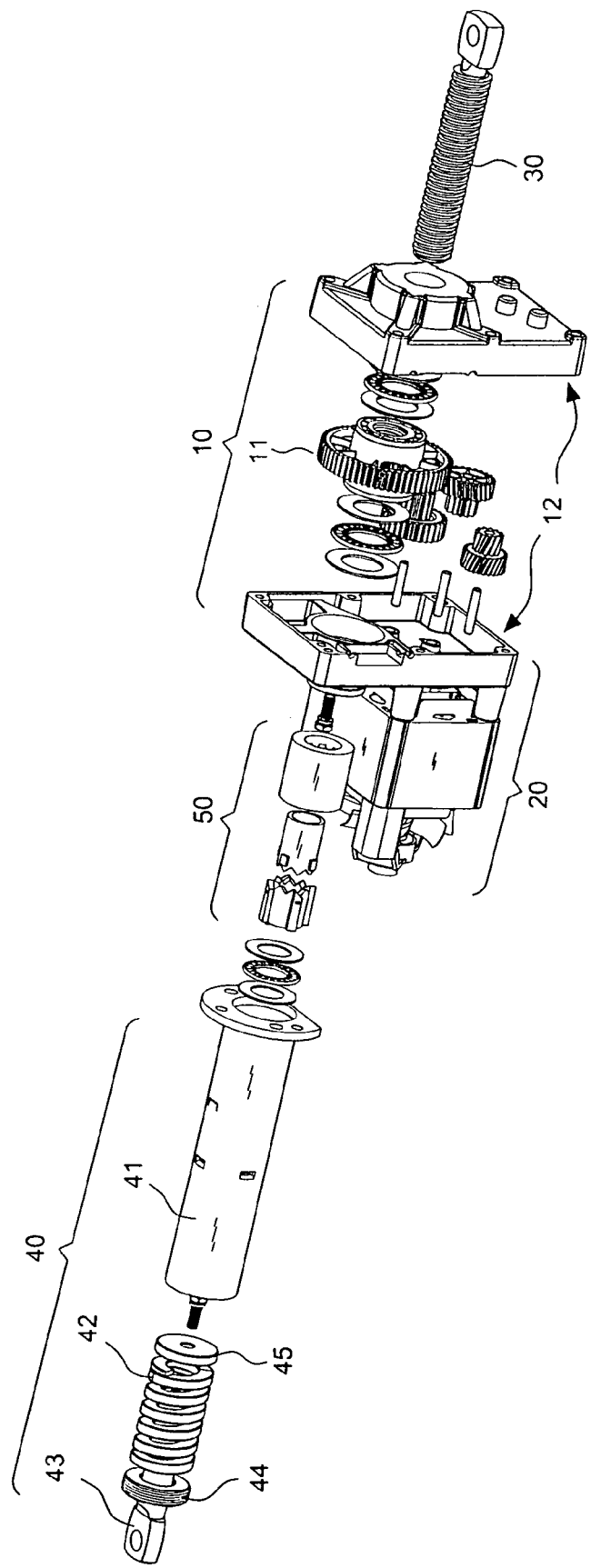
FIG. 4 is an exploded perspective view of a first embodiment of the invention.
Figure 5:
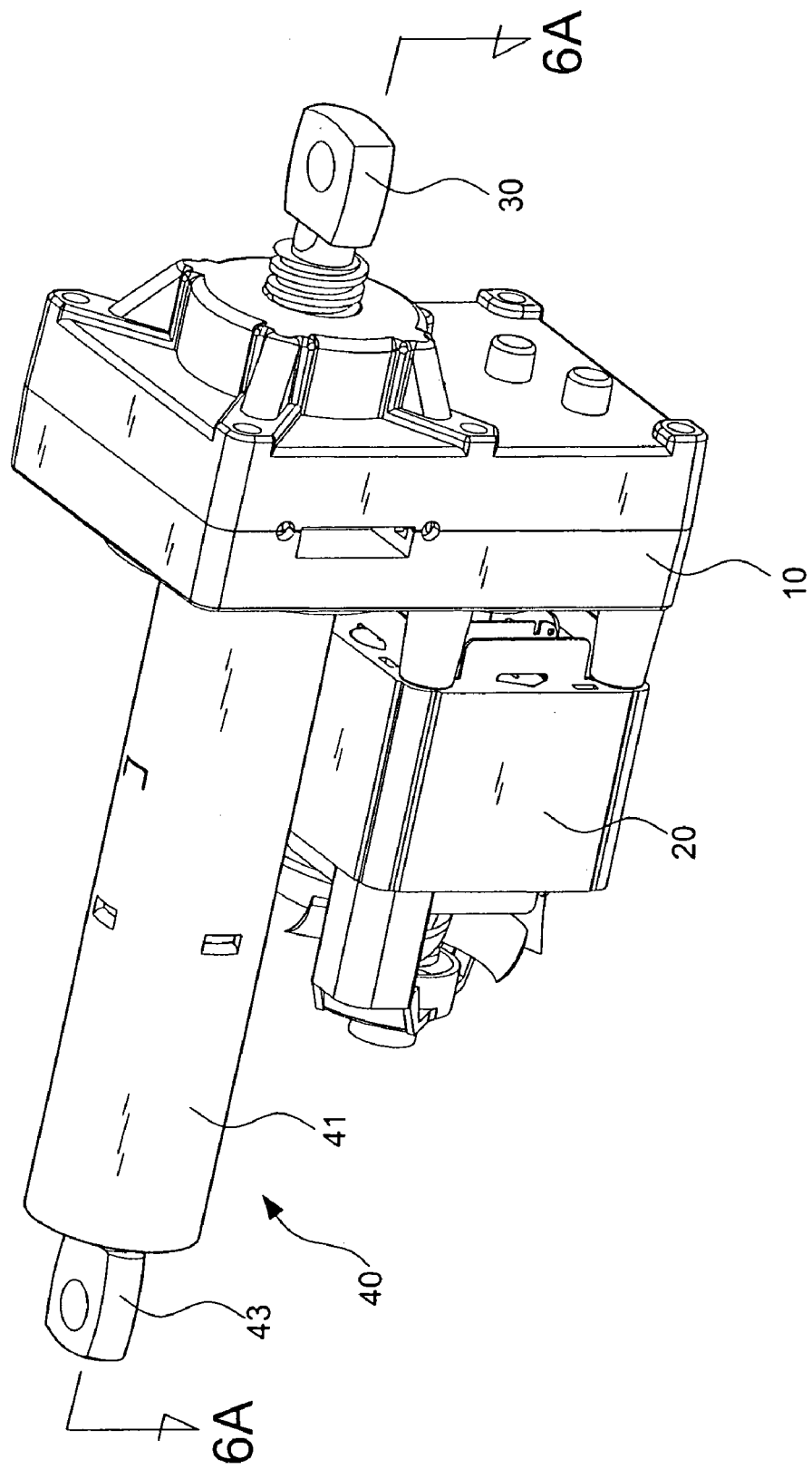
FIG. 5 is a perspective view of the first embodiment of the invention.
Figure 6A:
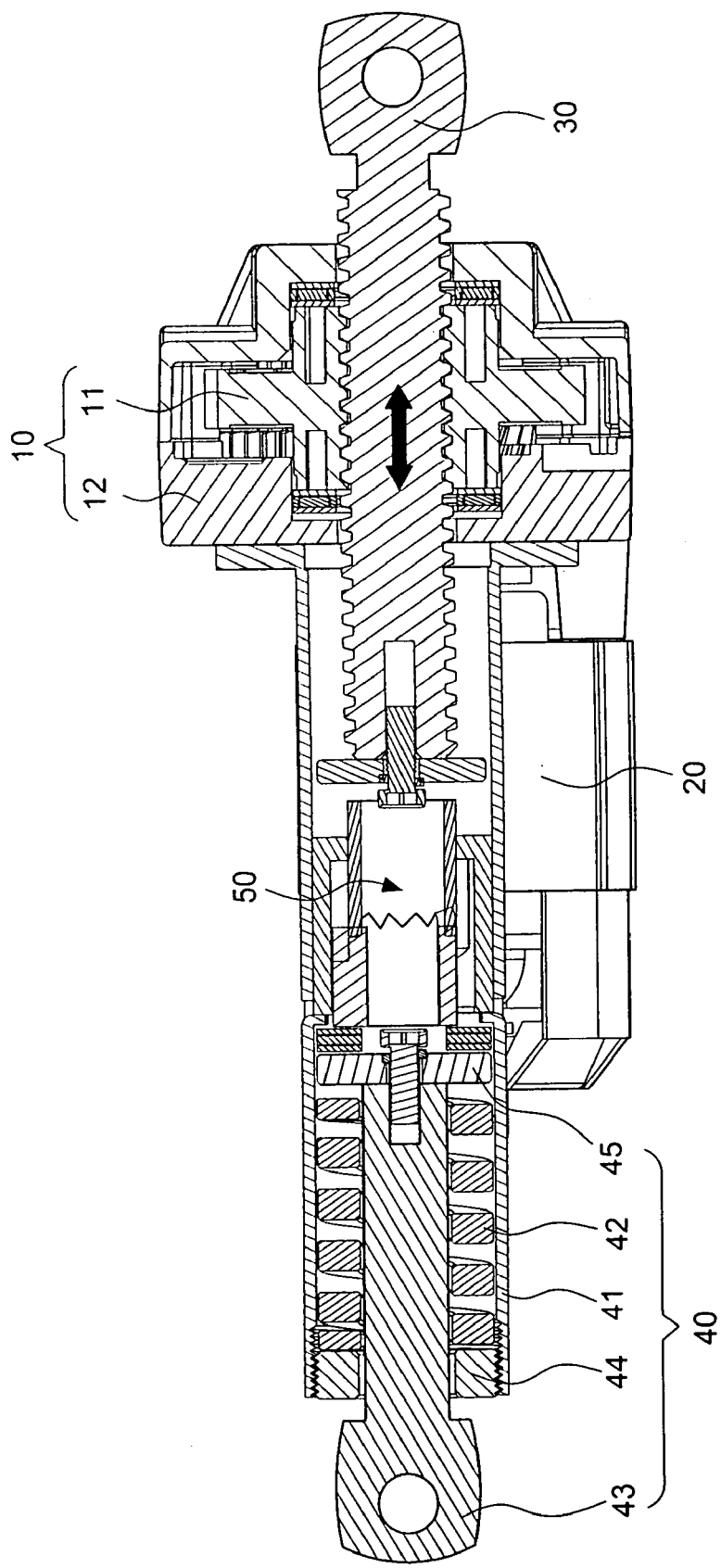
FIGS. 6A and 6B are the structure of the first embodiment of the invention in a cutaway view.
Figure 6B:
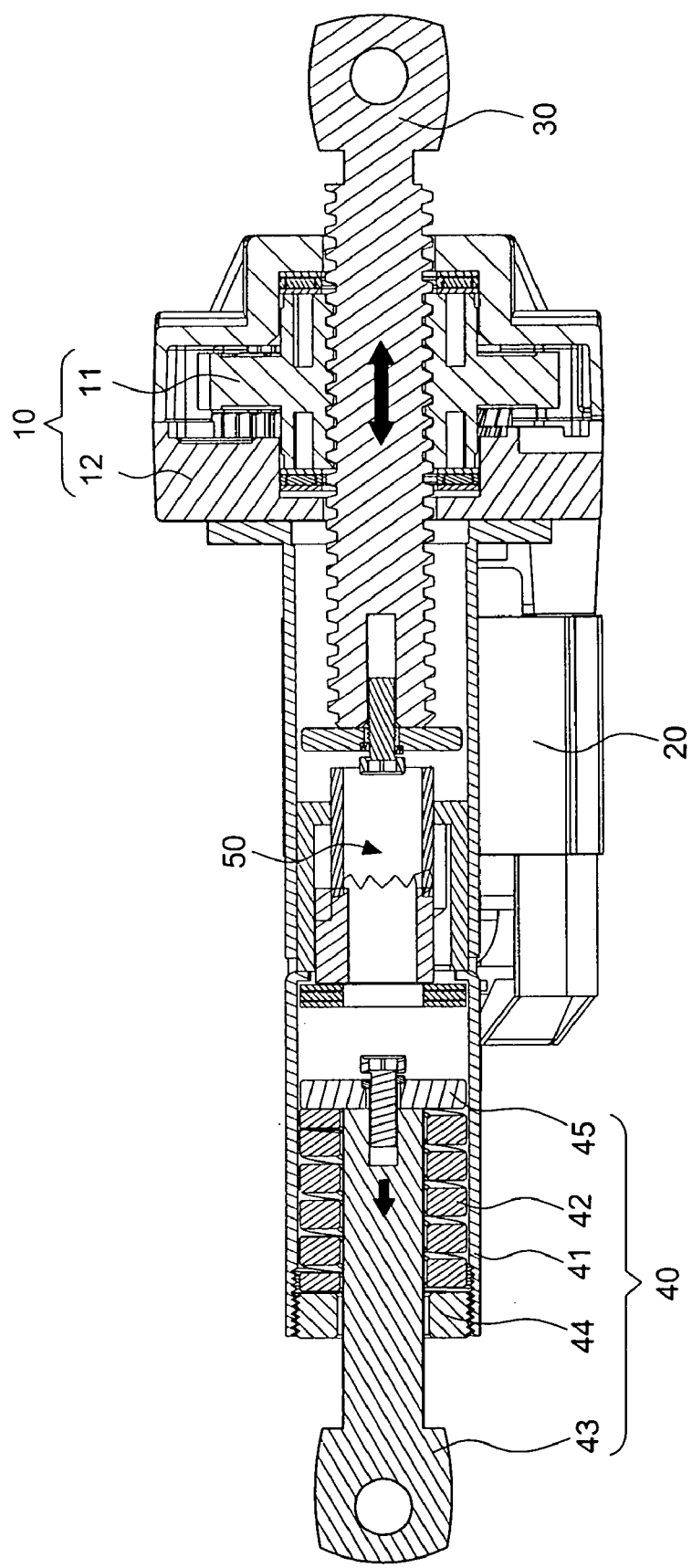
Figure 7:
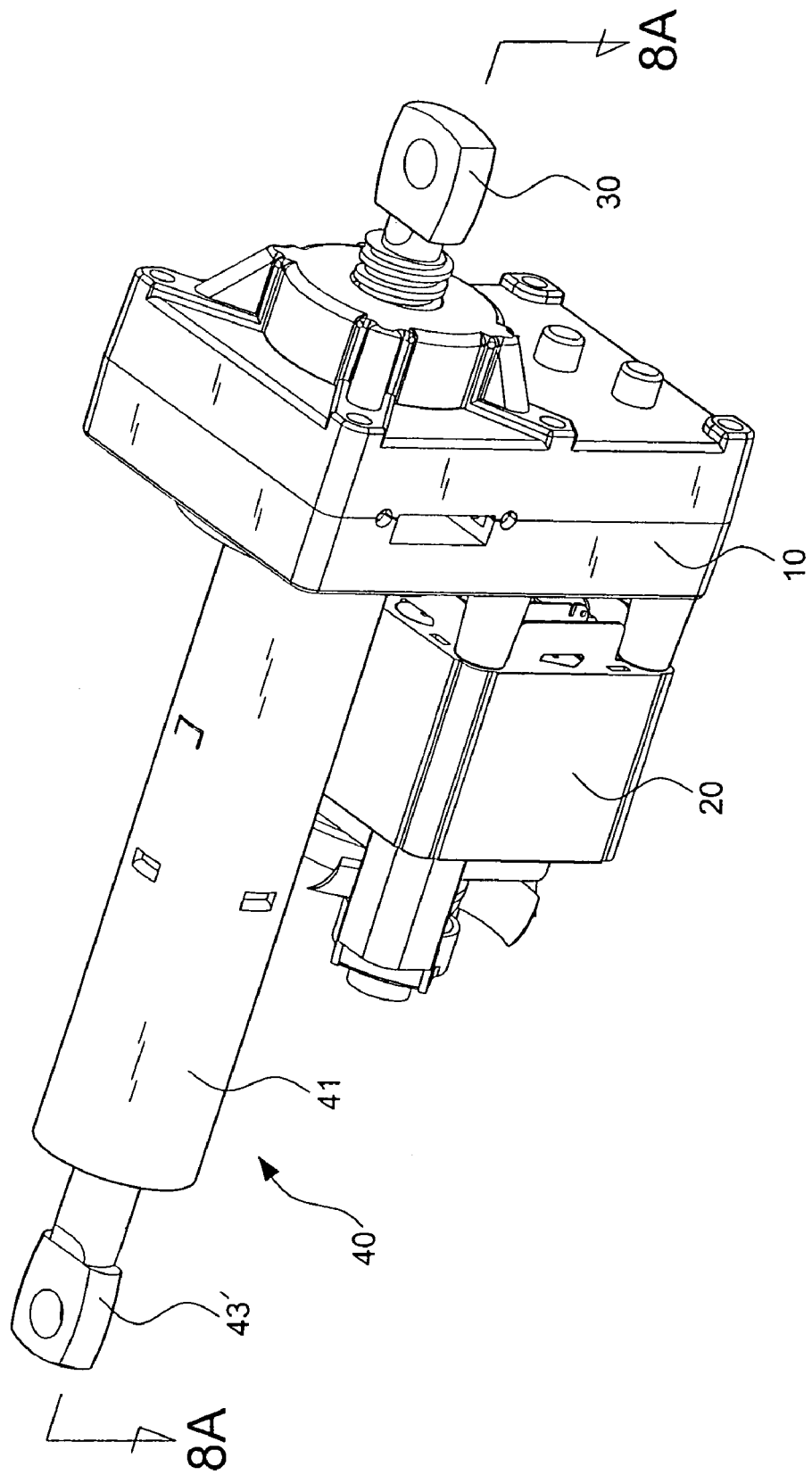
FIG. 7 is a perspective view of a second embodiment of the invention.

The shock-absorbing unit 40 includes a fixing sleeve 41 that is disposed on the external side of the housing 12 with respect to the internal end of the transmission rod 30. A shock-absorbing spring 42 is installed within the fixing sleeve 41. A telescopic lever 43 is adapted to actuate the shock-absorbing spring 42. In accordance with the invention, the telescopic lever 43 is outwardly extendable. In other words, the telescopic lever 43 is provided with a flange 45 at the internal end thereof as well as a ring cap 44 at the external end thereof so as to fasten the shock-absorbing spring 42 within the shock-absorbing unit 40. As shown in FIG. 6B, the telescopic lever 43 is outwardly extended. In other words, a pull type shock absorption is created. In this way, the configuration can be applied to the transmission mechanism of a conventional treadmill according to FIGS. 2A and 2B. In addition to adjusting the angle θ of elevation, the shock absorption function is available for the platform 62 and the running board thereon.

Figure 8A:
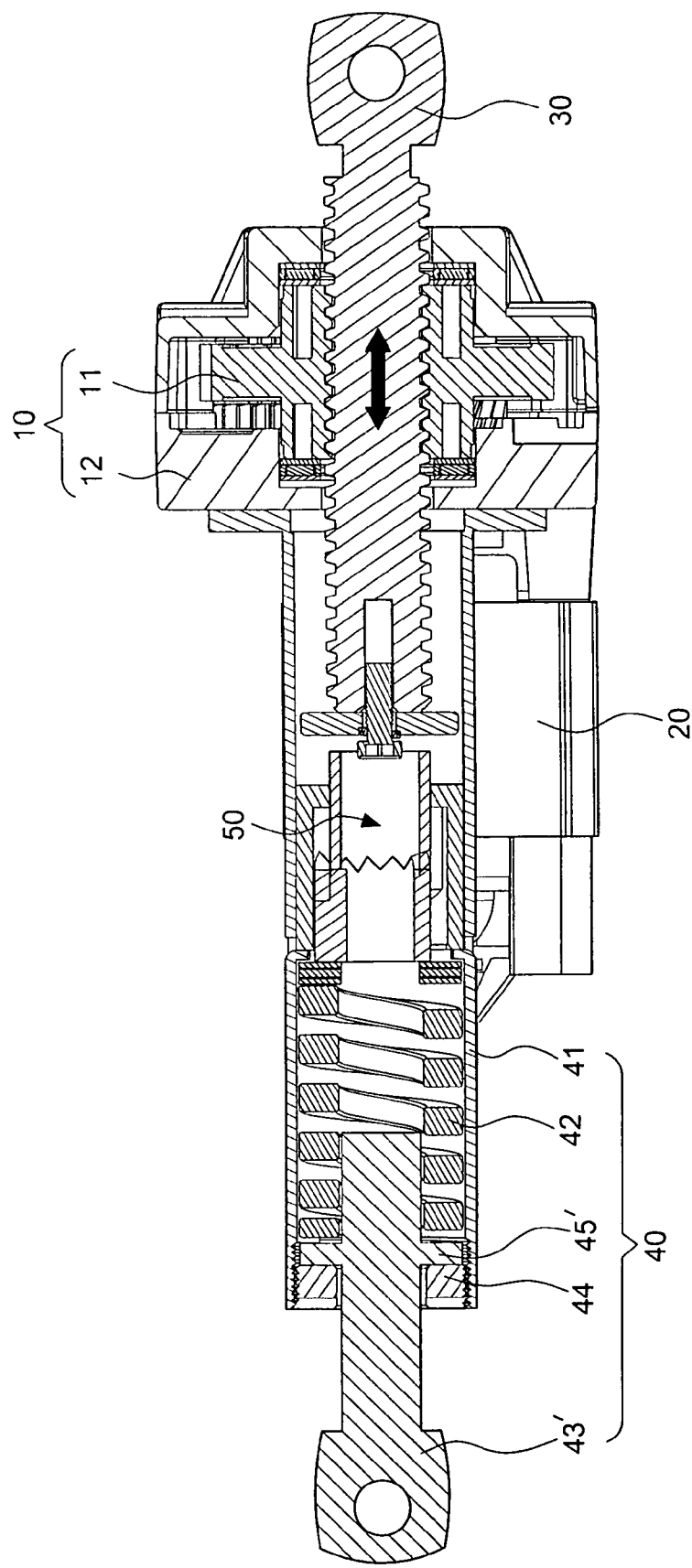
FIGS. 8A and 8B are the structure of the second embodiment of the invention in a cutaway view.
Figure 8B:
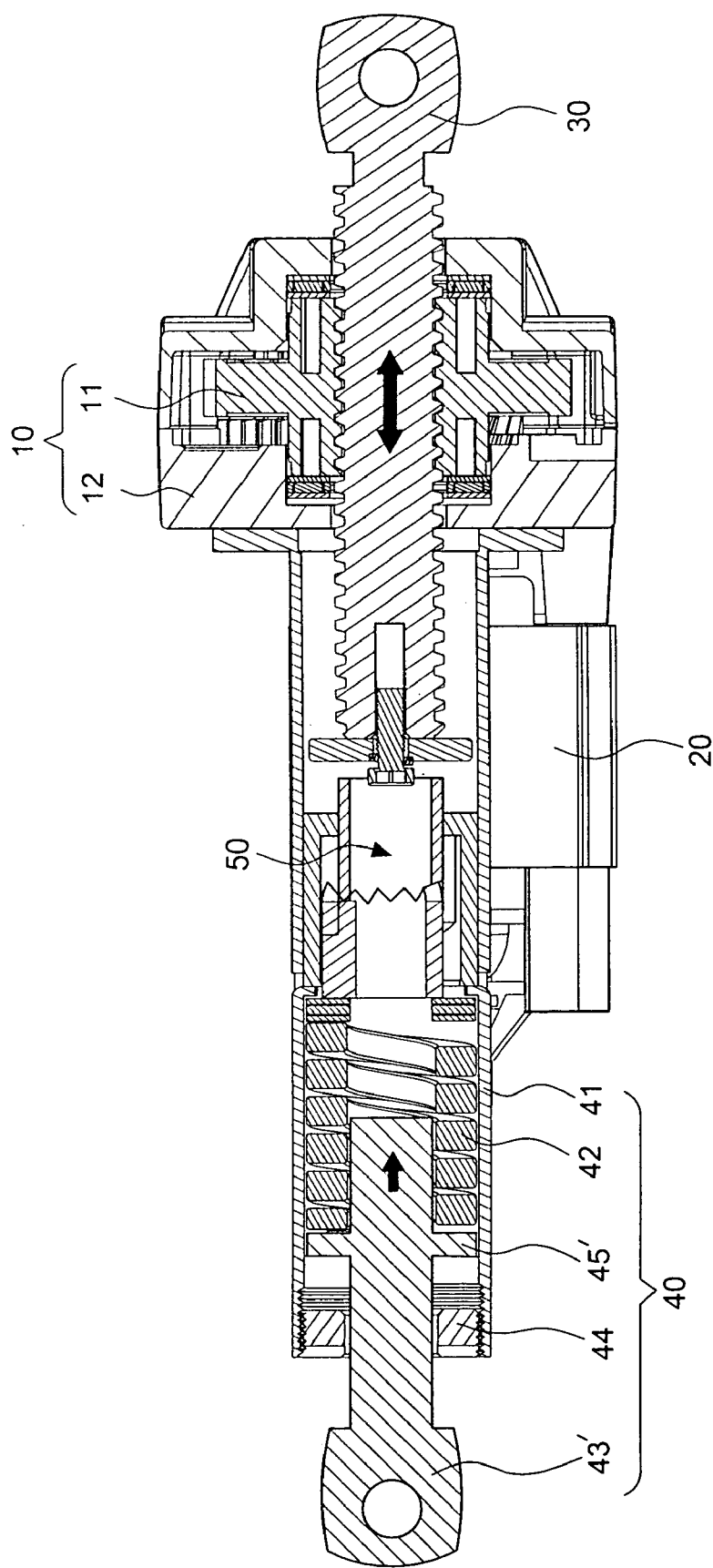

As shown in FIGS. 8A and 8B, a second embodiment of the invention is almost identical to the first embodiment. Meanwhile, the same element is marked with the same reference signs. The difference between them lies in that telescopic lever 43' is actuated in the retracting position. In other words, the flange 45' is positioned in the middle of the telescopic lever 43' and compressed against the external side of the shock-absorbing spring 42, as shown in FIG. 8B. This configuration serves as push-type transmission mechanism.

Figure 9:
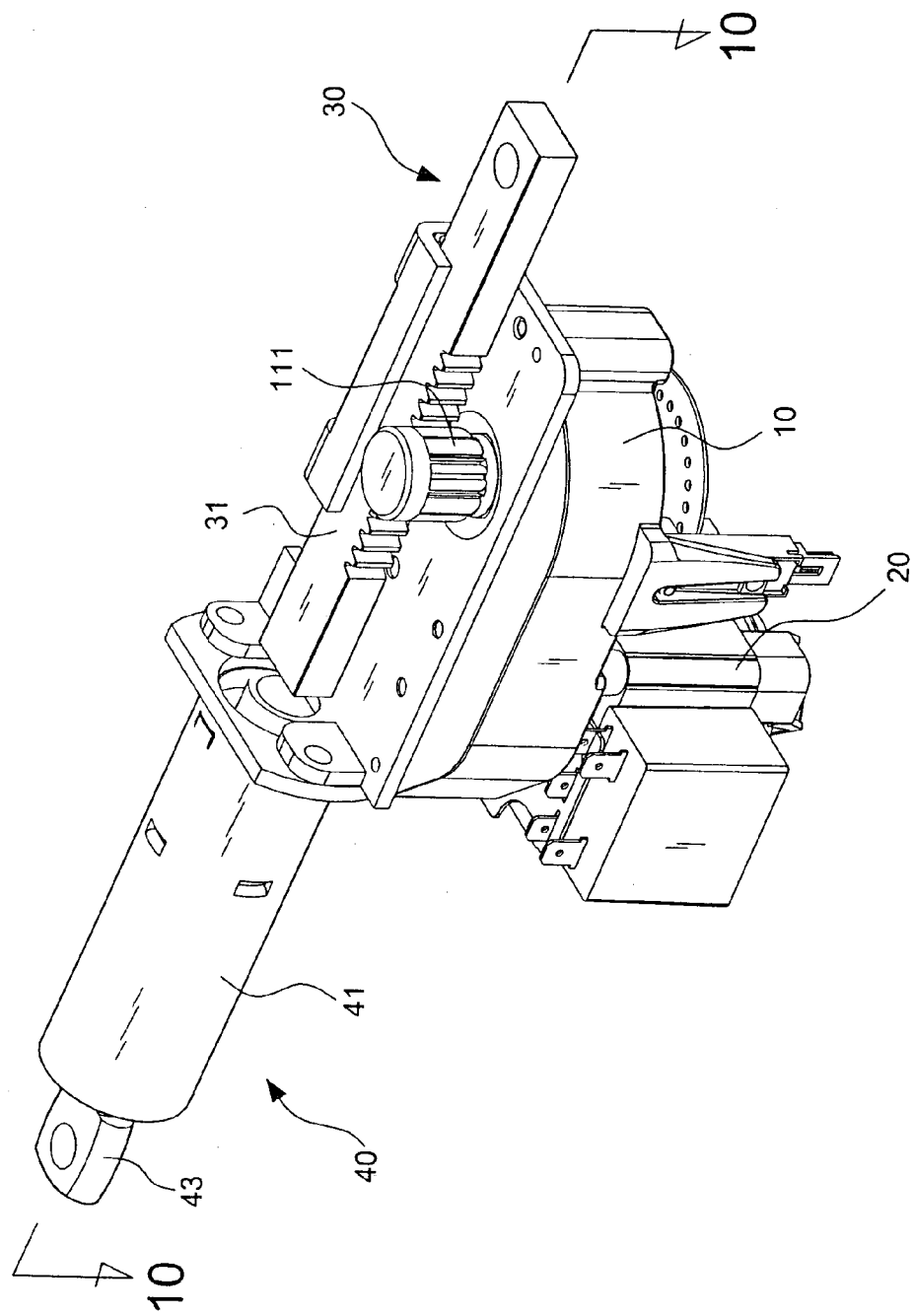
FIG. 9 is a perspective view of a third embodiment of the invention.
Figure 10:
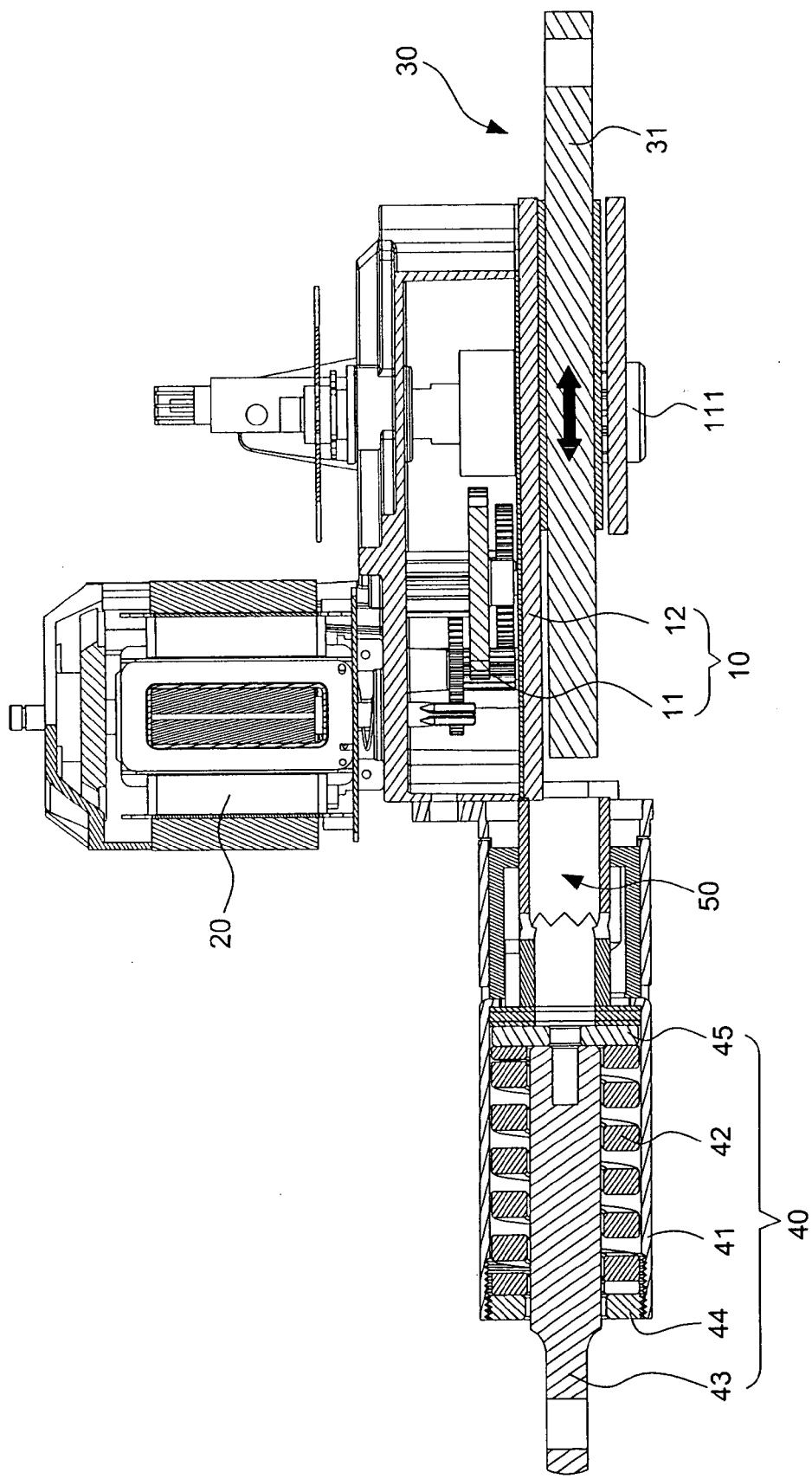
FIG. 10 is the structure of the third embodiment of the invention in a cutaway view.

FIGS. 9 and 10 illustrate a third embodiment of the invention. This embodiment belongs to the extension actuation type. The difference of the third embodiment from the first embodiment lies in that the transmission rod 30 is replaced by a rack 31. Otherwise, the other elements are the same.

Figure 11:
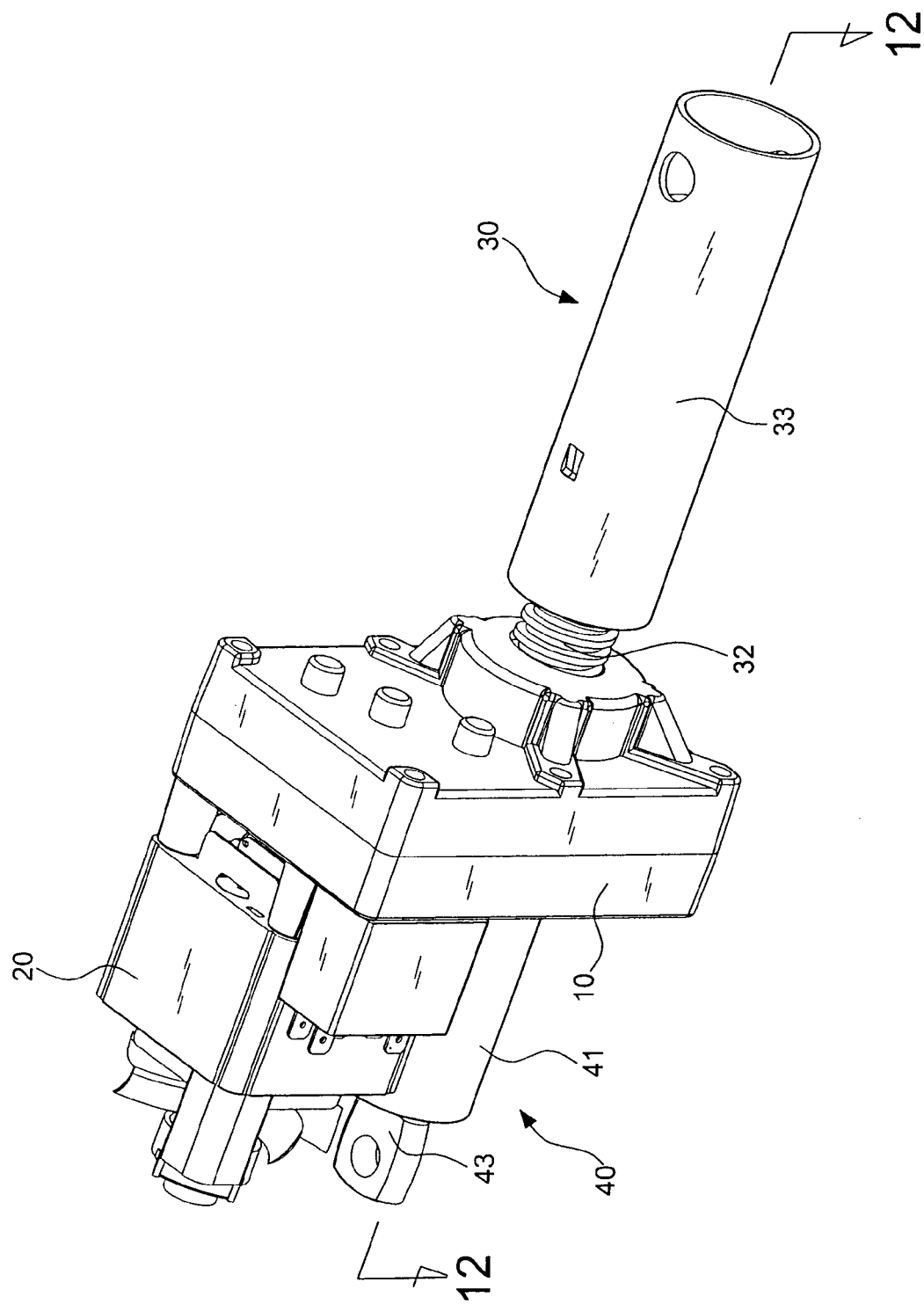
FIG. 11 is a perspective view of a fourth embodiment of the invention.
Figure 12:
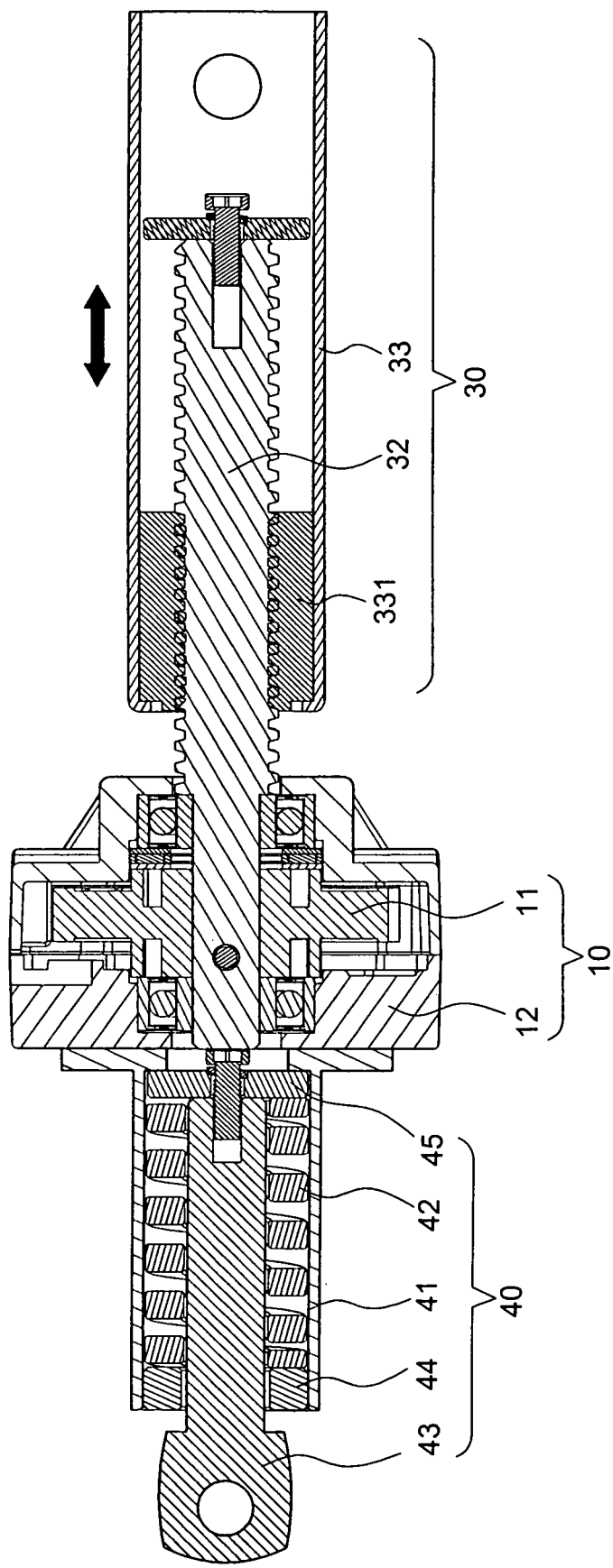
FIG. 12 is the structure of the fourth embodiment of the invention in a cutaway view.

FIGS. 11 and 12 illustrate a fourth embodiment of the invention. The difference lies in that the transmission rod 30 consists of a stationary spindle 32 and a matched telescopic sleeve 33. In other words, the stationary spindle 32 makes an in-place rotation without axial displacement when driven by the drive gear set 11. Meanwhile, a threaded socket 331 within the telescopic sleeve 33 is driven to allow for an axial travel of the telescopic sleeve 33.

Figure 13:
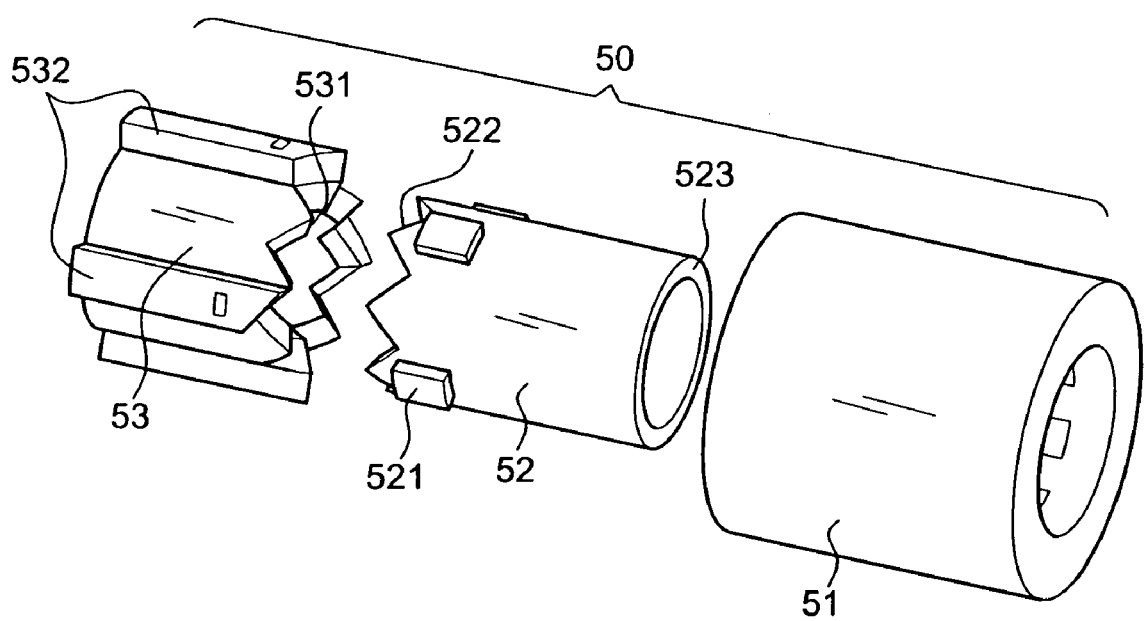
FIG. 13 is an exploded perspective view of an adjusting unit of the invention.
Figure 14:
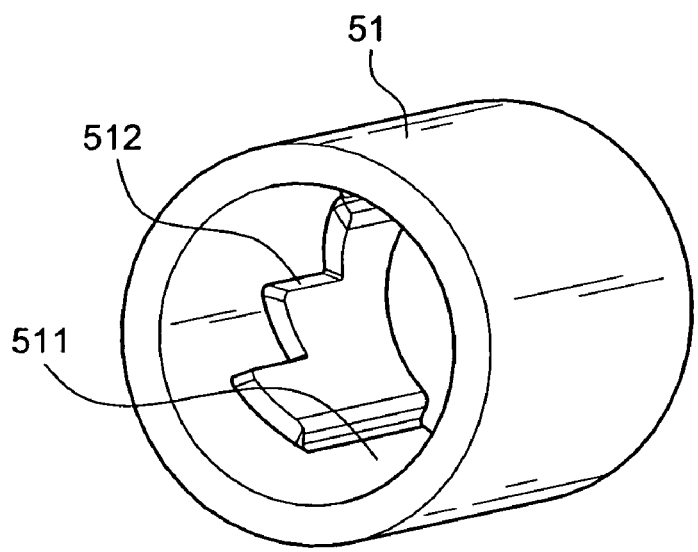
FIG. 14 is a perspective view of a socket according to FIG. 13 seen from another side.

Moreover, an adjusting unit 50 can be interposed between the transmission rod 30 and the shock-absorbing unit 40 in the first through third embodiments for adjusting the precompression of the shock-absorbing spring 42. In this way, the adjustment of the shock absorption grade is ensured. The adjusting unit 50 is so configured as a mechanism for retracting and extending a refill for a ball-point pen or other equivalent. As shown in FIGS. 13 and 14, the adjusting unit 50 includes:

a socket 51 having a plurality of guide grooves 511 and positioning grooves 512 on the internal wall thereof;

a push member 52 having a plurality of engageable and shiftable lugs 521 on the external circumference thereof to engage into the guide grooves 511 of the socket 51, a plurality of ring-shaped sharp teeth 522 being formed on the external rim of the push member 52, the internal rim of the push member 52 extending to the bottom side of the socket 51; and a rotating member 53 having an internal rim with ring-shaped teeth 531 corresponding to the ring-shaped sharp teeth 522 of the push member 52 as well as axial ribs 532 corresponding to the guide grooves 511 of the socket 51, the axial ribs 532 further having an external rim abutting against a pad ring 46 of the shock-absorbing unit 40.

Figure 15A:
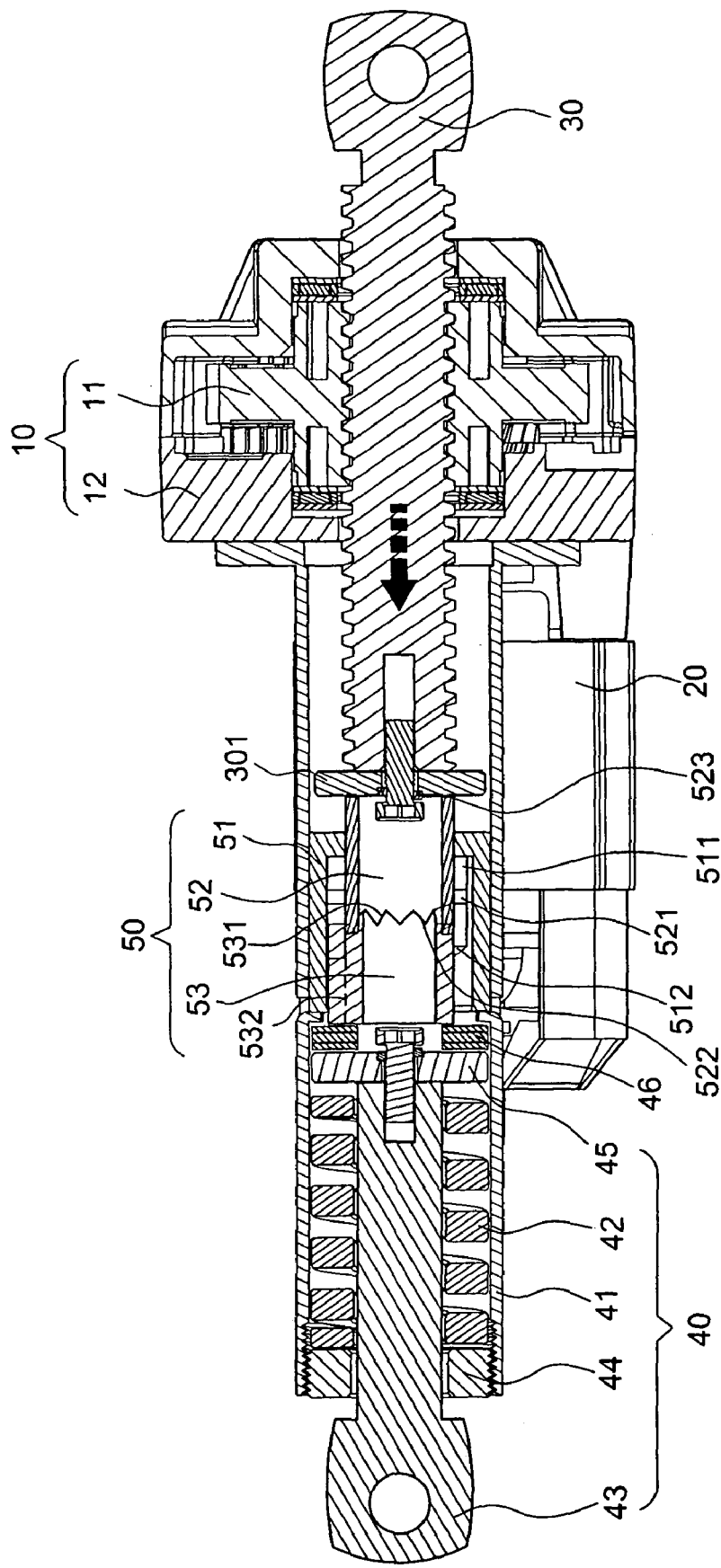
FIGS. 15A and 15B are cutaway views of an adjusting unit in operation.
Figure 15B:
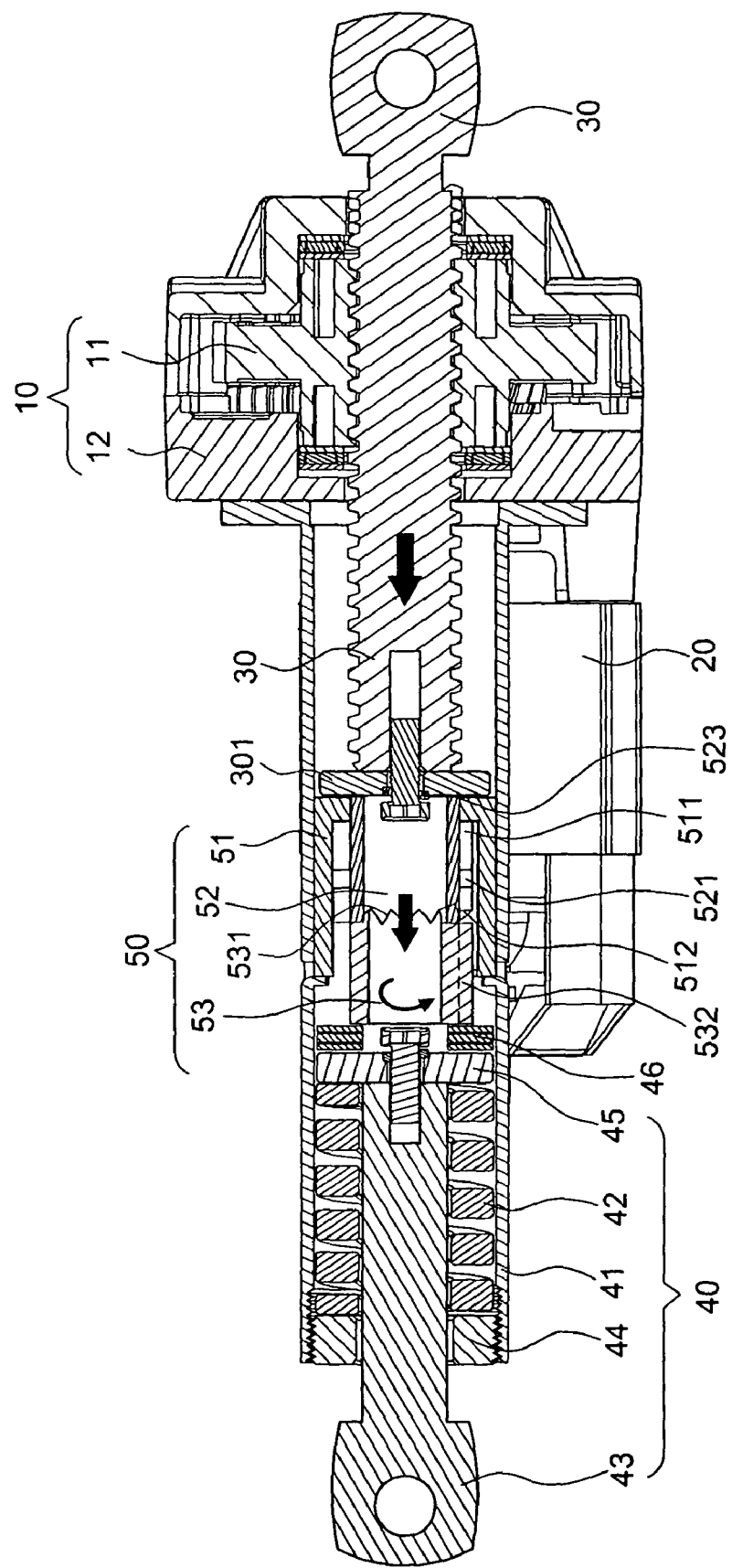

Based on the above-mentioned configuration, the adjusting unit 50 makes use of the push member 52 to push the rotating member 53 in such a way that the rotating member 53 can rotate at an angle in addition to an axial shift within the socket 51. In this way, the axial rib 532 falls into one of the positioning grooves 512 at a certain height, thereby ensuring the adjustment of the length of the rotating member 53 projecting from the socket 51. The first embodiment taken as example will be described more as follows. As shown in FIGS. 15A and 15B, when the transmission rod 30 gradually shifts to the internal rim 523 of the push member 52, the pad 301 fixed at the inner end of the transmission rod 30 will be forced to push the push member 52 outwardly. Meanwhile, the rotating member 53 will be brought into rotation until it engages into the positioning grooves 512 of the socket 51 in place. At that time, the front end of the rotating member 53 abuts against the pad ring 46 and the flange 45, thereby forcing the shock-absorbing spring 42 in a precompression state. Accordingly, the adjustment of the precompression grade of the push member 52 is ensured. In other words, the projecting length of the adjusting unit 50 is controlled by an internal shift of the transmission rod 30. Besides, the transmission rod 30 has to return back to the prearranged position after the transmission rod 30 is pushed against the push member 52. In this way, the rotating member 53 will be slightly retracted by the resilience of the shock-absorbing spring 42 such that the bottom end of the axial ribs 532 is engaged into the positioning grooves 512 at a preset height. In readjusting the pushing position thereof, the transmission rod 30 can be shifted inwardly again. Thus, a desired precompression state can be achieved by repeating the above-mentioned process. The mechanical principle of the adjusting unit 50 belongs to the prior art so that no further description thereto are given hereinafter. Based on the aforementioned configuration, the external end of the transmission rod 30 and the telescopic lever 43 of the invention can be installed between the base frame and the platform of a treadmill. In addition, the pull type shock absorption or the push type shock absorption can be chosen according to different application. The whole length of the adjusting unit 50 can be controlled by pushing the transmission rod 30 against the adjusting unit 50, thereby achieving the adjustment of the precompression grade of the shock-absorbing spring 42 according to the different weight of the operators. According to the fourth embodiment, the transmission rod 30 is the combination of the stationary spindle 32 and the telescopic sleeve 33 without the installation of the adjusting unit 50. In addition to the conventional adjustment of the angle of elevation of the running board with respect to the horizontal, a shock-absorption adjusting mechanism can be provided therein such that an integral configuration with an excellent shock absorption effect is created.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A transmission mechanism with the function of the shock absorption, comprising:

a) a transmission unit adapted to receive a drive gear set within a housing;

b) a motor coupled to the gear set and being mounted adjacent to and external the housing for providing the drive gear set with necessary driving power;

c) a transmission rod disposed within the drive gear set to allow for a power transmission;

d) a shock-absorbing unit including a fixing sleeve being disposed at the external side of the housing with respect to the internal end of the transmission rod, a shock-absorbing spring being installed within the fixing sleeve, and a telescopic lever being adapted to actuate the shock-absorbing spring; wherein said shock-absorbing spring is linearly displaceable and provides resistance to a linear displacement of said telescopic lever; and e) an adjusting unit interposed between the transmission rod and the shock-absorbing unit, the adjusting unit including:

a socket having a plurality of guide grooves and positioning grooves on the internal wall thereof;

a push member having a plurality of engageable and shiftable lugs on the external circumference thereof to engage into the guide grooves of the socket, a plurality of ring-shaped sharp teeth being formed on the external rim of the push member, the internal rim of the push member extending to the bottom side of the socket; and a rotating member having an internal rim with ring-shaped teeth corresponding to the ring-shaped sharp teeth of the push member as well as axial ribs corresponding to the guide grooves of the socket, the axial ribs further having an external rim abutting against a pad ring of the shock-absorbing unit.

2. The transmission mechanism with the function of the shock absorption as recited in claim 1, wherein the telescopic lever is retractable.

3. The transmission mechanism with the function of the shock absorption as recited in claim 1, wherein the transmission rod is a telescopic spindle.

4. The transmission mechanism with the function of the shock absorption as recited in claim 1, wherein the telescopic lever is retractable.

5. The transmission mechanism with the function of the shock absorption as recited in claim 1, wherein the transmission rod is a telescopic spindle.

6. The transmission mechanism with the function of the shock absorption as recited in claim 2, wherein the transmission rod is a telescopic spindle.

7. The transmission mechanism with the function of the shock absorption as recited in claim 5, wherein the telescopic lever is retractable.

\* \* \* \* \*